United States Patent [19]

Okajima et al.

[11] Patent Number: 4,956,015

[45] Date of Patent: Sep. 11, 1990

[54] POLISHING COMPOSITION

[75] Inventors: Taizo Okajima, Kitakyushu; Kouichi Ootani, Nohgata; Tsutomu Yamada, Machida, all of Japan

[73] Assignee: Mitsubishi Kasei Corporation, Tokyo, Japan

[21] Appl. No.: 298,048

[22] Filed: Jan. 18, 1989

[30] Foreign Application Priority Data

Jan. 19, 1988 [JP] Japan .................................. 63-9385
Feb. 9, 1988 [JP] Japan .................................. 63-27941

[51] Int. Cl.$^5$ ............................................. C09G 1/02
[52] U.S. Cl. ...................................... 106/3; 252/79.1; 51/308; 51/309
[58] Field of Search ........................... 106/3; 252/79.1; 51/508, 509

[56] References Cited

U.S. PATENT DOCUMENTS

| | | | |
|---|---|---|---|
| 4,225,349 | 9/1980 | Koshiyama et al. | 106/3 |
| 4,696,697 | 9/1987 | Kitano et al. | 106/3 |
| 4,705,566 | 11/1987 | Senda et al. | 106/3 |
| 4,769,046 | 9/1988 | Senda et al. | 106/3 |

OTHER PUBLICATIONS

Kirk–Othmer Encyclopedia of Chemical Technology, 3rd Ed, vol. 2, pp. 218–245, 1978.

*Primary Examiner*—William R. Dixon, Jr.
*Assistant Examiner*—Helene Klemanski
*Attorney, Agent, or Firm*—Oblon, Spivak, McClelland, Maier & Neustadt

[57] ABSTRACT

The present invention relates to a polishing composition comprising water, α-alumina and boehmite. The addition of boehmite contributes to an improvement of the polishing performance to provide an excellent polished surface and a high polishing rate. The polishing performance can further be improved by incorporating at least one member selected from the group consisting of a water-soluble metal salt, an ammonium salt and a metal nitrite. The polishing composition of the present invention is suitable for polishing metals, plastics or glass. It is particularly useful for polishing a surface of a memory hard disk plated with nickel or a nickel alloy.

24 Claims, No Drawings

POLISHING COMPOSITION

The present ivention relates to a polishing composition. More particularly, it relates to a polishing composition capable of polishing a metal, a synthetic resin or glass with high polishing efficiency to provide an excellent polished surface. The polishing composition of the present invention is useful particularly for polishing a metal surface such as a memory hard disk surface.

In the precision polishing of materials such as silicon or other semiconductor substrates, various magnetic memory hard disks or laser parts, the production on an industrial scale of which has been remarkably increased during the past ten years, the level of requirement for the surface smoothness and defectlessness freeness from defects such as scratch marks, orange peel, pits, nodules or cracks) of the polished surface, has become very high as compared with the level of polishing technique in the past. Further, a large amount of investment is required for installations and facilities for the production and inspection, and it has become important to reduce costs by improving the production speed and by reducing defective products. Accordingly, with respect to the polishing agents to be used in these fields, it has been strongly desired to improve the polishing rate as well as the polishing precision.

As a polishing agent, a composition having alumina dispersed in water, has been known since a long ago. Howerver, such a polishing agent is inadequate in the polishing rate. If the particle size of alumina is increased to improve the polishing rate, the polished surface tends to be roughened. Therefore, it has been difficult to satisfy the polishing rate and the surface condition simultaneously.

Japanese Unexamined Patent Publication No. 89389/1979 proposes to employ, as alumina, calcined alumina obtained by calcining boehmite at a high temperature. Further, it proposes to improve the polishing performance by adding an aluminum compound such as aluminum nitrate or aluminum polychloride as a polishing accelerator to a slurry comprising calcined alumina and water. Japanese Unexamined Patent Publication No. 25187/1987 proposes to use such a composition for polishing a memory hard disk. However, such a polishing composition also fails to satisfy the polishing rate and the surface condition simultaneously.

The present inventors have found that when boehmite is incorporated to a polishing composition comprising water and $\alpha$-alumina, the polishing rate can remarkably be improved without reducing the polish finishing effects such as the smoothness of the polished surface or the prevention of formation of surface defects (such as scratch marks, orange peel, etc.). The present invention has been accomplished on the basis of this discovery.

The present invention provides a polishing composition comprising water, $\alpha$-alumina and boehmite.

The present invention also provides a polishing composition comprising water, $\alpha$-alumina, boehmite and a water-soluble metal salt.

Further, the present invention provides a polishing composition comprising water, $\alpha$-alumina, boehmite and an ammonium salt of an inorganic or organic acid.

Still further, the present invention provides a polishing composition comprising water, $\alpha$-alumina, boehmite and a metal nitrite.

Now, the present invention will be described in detail with reference to the preferred embodiments.

There is no particular restriction as to the $\alpha$-alumina to be used in the present invention. However, it is usual to employ an alumina obtained by calcining aluminum hydroxide such as bayerite, gibbsite or hydrargillite, or an alumina other than $\alpha$-alumina such as boehmite, $\gamma$-alumina or $\theta$-alumina, at a temperature of at least 1,100° C. There is a tendency such that the higher the calcination temperature, the higher the polishing rate. Therefore, it is preferred to employ $\alpha$-alumina obtained by the calcination at a temperature of at least 1,200° C., particularly from 1,200° to 1,500° C.

In consideration of the polishing precision and polishing rate, the u-alumina to be used in the present invention is a fine powder usually having an average particle size of from 0.1 to 10 $\mu$m, preferably from 0.1 to 3 $\mu$m, and having a maximum particle size of at most 30 $\mu$m, preferably at most 20 $\mu$m. Accordingly, $\alpha$-alumina obtained by calcination is usually pulverized by a pulverizer such as a ball mill or a vibration mill in the case of a wet slurry system, and coarse particles are removed by gravity sedimentation or centrifugal separation, or it may be pulverized and classified to have a desired particle size in a dry system e.g. by jet stream.

The amount of the $\alpha$-alumina is usually from 1 to 30% by weight, preferably from 2 to 15% by weight, based on the total amount of the polishing composition. If the amount of the $\alpha$-alumina is too small, the polishing rate becomes small, and if it is too large, it becomes difficult to maintain a uniform dispersion and the handling becomes difficult due to an excessive increase of the viscosity of the slurry.

Boehmite is a kind of alumina hydrate. The alumina hydrate may be gibbsite, bayerite, nordstrandite, boehmite or diaspore depending upon the type of the crystal form. It is essential for the polishing composition of the present invention that it contains boehmite. The boehmite may be represented by the chemical formula of Al·OOH or $Al_2O_3 \cdot H_2O$.

The boehmite is usually produced by a method wherein gibbsite or the like is subjected to hydrothermal treatment under pressure at a temperature of about 250° C., or by a method wherein an organoaluminum compound of the formula $Al(OR)_3$ wherein R is an alkyl group, is hydrolyzed. It is an industrial material widely used for alumina sols, for ceramic binders, for antistatic treatment of fiber products or carpets, for purification treatment of water, for cosmetics, as a thickner for ointments, for alumina catalysts or as a carrier for catalysts. Powder products are commercially available, for example, from Kaiser Company, U.S.A., Vista Chemical Company, U.S.A., and Condea Chemie, West Germany. Boehmite has a nature such that when e.g. a boehmite powder, of which 95% is constituted by particles of at most 200 $\mu$m and 50% is constituted by particles of at most 45 $\mu$m, is stirred and dispersed in water or in acidic water, it will be dispersed in the form of super fine particles having a size of at most 0.1 $\mu$m, partially in a fibrous form and mostly in a particulate form and will form a colloidal sol. The boehmite sol has an isoelectric point of 9.4, and the particles themselves are positively electric charged, as observed by an electrophoretic method.

In the present invention, the boehmite to be dispersed in water may be used in the form of a powder or a boehmite sol. In either case, the boehmite should be capable of forming a sol having a particle size of at most 0.1 $\mu$m when dissolved in water. The amount of the boehmite is usually from 0.1 to 20% by weight, preferably from 0.5 to 10% by weight, based on the total amount of the composition. If the amount of the boehmite is too small, no adequate effect for the improvement in the polishing rate can be expected. On the other hand, if the amount is excessive, the apparent viscosity and the thixsotropic properties tend to increase, whereby the dispersion uniformity of α-alumina tends to be impaired and the handling properties tend to be poor such that it becomes difficult to discharge the polishing composition from the container.

The polishing composition of the present invention may be prepared simply by mixing and stirring water with the above-mentioned α-alumina and boehmite. There is no particular restriction as to the order of mixing these materials.

The composition consisting solely of water, α-alumina and boehmite, can be used as a polishing agent. However, in order to further improve the polishing performance, other components may preferably be incorporated.

In the present invention, a water-soluble metal salt, an ammonium salt of an inorganic or organic acid and a metal nitrite are used as such components to be added to the water-alumina-boehmite composition to improve the polishing performance.

As the water-soluble metal salt, the one having a solubility of at least 1 g per 100 g of water may be used. However, preferably it has a solubility of at least 5 g per 100 g of water.

Such a water-soluble metal salt may, for example, be a salt of an alkali metal such as lithium, sodium or potassium, an alkaline earth metal such as magnesium or calcium, or a metal such as zinc, aluminum or nickel, with an inorganic acid such as nitric acid, sulfurlic acid, hydrochloric acid or phosphoric acid or with an organic acid such as formic acid, acetic acid or citric acid. Specifically, it includes lithium nitrate, lithium sulfate, lithium citrate, sodium nitrate, sodium sulfate, sodium thiosulfate, sodium chloride, sodium acetate, potassium sulfate, potassium chloride, magnesium nitrate, magnesium sulfate, magnesium ammonium sulfate, magnesium chloride, magnesium acetate, calcium nitrate, calcium chloride, zinc sulfate, zinc chloride, zinc acetate, aluminum nitrate, aluminum sulfate, aluminum phosphate, aluminum chloride, potassium alum, nickel nitrate, nickel sulfate, nickel formate and nickel acetate. Among them, an inorganic salt of magnesium, calcium or aluminum such as magnesium nitrate, magnesium chloride, magnesium sulfate, calcium nitrate, aluminum nitrate or aluminum sulfate, is preferred.

The ammonium salt of an inorganic or organic salt may be an ammonium salt of an inorganic acid such as sulfuric acid, sulfurous acid, hydrochloric acid, nitric acid, nitrous acid or phosphoric acid, or of an organic acid such as formic acid, acetic acid or oxalic acid. Among them, an ammonium salt of sulfuric acid, hydrochloric acid, nitric acid, phosphoric acid or acetic acid is preferred.

As the metal nitrite, various metal salts may be mentioned. However, salts of metals in Groups I to III of the Periodic Table are preferred. Specifically, nitrites of sodium, potassium, calcium, magnesium, barium, zinc and aluminum may be mentioned.

Among them, calcium nitrite, potassium nitrite and sodium nitrite are preferred.

The amount of the water-soluble metal salt, the ammonium salt of an inorganic or organic acid or the metal nitrite is usually from 0.1 to 20% by weight, preferably from 0.1 to 10% by weight, based on the total amount of the composition. If this amount is too small, no adequate effects of the present invention can be expected. On the other hand, if the amount is excessive, no additional effects for improvement can be obtained, and there will be disadvantages such that crystals of the salt are likely to precipitate at a low temperature during winter, and the load of the cleaning treatment of the waste water tends to increase.

The reason why the polishing composition of the present invention provides excellent polishing effects is not clearly understood. It is believed, however, that the presence of boehmite influences the dispersion state of particles in the polishing agent slurry so that it contributes for the improvment of the polishing effects. Namely, when the above mentioned α-alumina particles are stirred and dispersed in water or in acidic water, individual particles will have positive charges and adsorb anions of water or of the electrolyte to form an electrical double layer. In such a dispersion system of fine particles, a certain equilibrium condition is established between flocculation due to van del Waals attraction and repulsion due to electrical repulsion force. When boehmite is present in this system, boehmite is positively charged in water, and the mutual dispersing effects among particles due to electrical repulsion force is thereby enhanced as the entire dispersion system. In the precision polishing with such a slurry polishing agent, α-alumina particles are held on the surface of the polishing pad as free abrasive particles in a single disperse or coagulated state, and as they roll over the surface of the object to be polished under a certain polishing pressure, the abrasive particles (α-alumina particles) provide polishing effects while rolling or sliding. Therefore, the greater the number of the polishing action points by the abrasive particles on the surface of the object to be polished and the more uniform the polishing action force at the respective polishing action points, the greater the polishing amount per unit sliding amount during the polishing operation and per unit hour should be and the higher the precision of the polished surface should be. However, at the contact surface between the polishing pad and the surface of the object to be polished, fine particles (abraded waste) formed by the abrasion of the object to be polished, are present in the form of a slurry having such particles dispersed in water, and the dispersion or flocculation conditions of individual particles are considered to substantially affect the polishing amount and the polish finishing properties. The water-soluble metal salt, the ammonium salt or the metal nitrite added to the composition comprising water, α-alumina and boehmite, is believed to further affect the dispersion or flocculation condition of the particles to improve the polishing performance.

The polishing composition of the present invention can be prepared simply by mixing and stirring the abovementioned components. There is no particular restriction as to the order of mixing such components. For the preparation of the polishing composition, the following various known additives may be incorporated depending upon the type of the object to be polished or upon the condition for the polishing operation. As such additives, surfactants such as a sodium alkylbenzene sulfonate or a condensation product of formalin with naphthalene sulfonic acid, cellulose derivatives such as carboxy methyl cellulose, hydroxy ethyl cellulose and their salts, and polyacrylic acid and its salts, are known.

A surfactant is effective for improving the dispersibility of particles or for preventing secondary flocculation, and it is added usually in an amount of about 1% by weight or less.

Cellulose, its derivatives, polyacrylic acid and their derivaties serve to increase the viscosity or to prevent secondary flocculation, and they are added usually in an amount of about 3% by weight or less.

Further, an acid or alkali may be added to control the pH.

The pH of the polishing composition of the present invention is usually from 3 to 6, although it varies depending upon the type and the amount of the salt. In general, when the pH of the water-alumina system polishing agent is deviated to the alkaline side, the polishing agent tends to have a high viscosity, thus leading to troubles such as the clogging and deterioration of the polishing pad made of a porous network structure and formation of scratch marks on the surface of the object to be polished. Therefore, it is usual that the pH of the polishing composition is adjusted towards the acidic side. However, depending upon the polishing object, an acid or alkali may be added to adjust the pH to a level outside the above-mentioned range.

The polishing composition of the present invention is useful for polishing metals, glass or plastics. It is particularly useful for polishing memory hard disks, since it is thereby possible to obtain a defectless polished surface. However, the application of the composition is not limited to such specific objects.

Now, the present invention will be described in further detail with reference to Examples. However, it should be understood that the present invention is by no means restricted to such specific Examples.

EXAMPLE 1

Preparation of a polishing composition

Aluminum hydroxide was calcined at 1,200° C. for 5 hours and then pulverized in a wet system to obtain α-alumina having an average particle size of 0.55 μm and the maximum particle size of 5 μm. This alumina was dispersed by a high performance mixer to obtain a slurry having a concentration of 6% by weight, which was then adjusted to pH 3.4 with a small amount of dilute nitric acid to obtain an alumina slurry. Then, a boehmite sol having a particle size of at most 0.1 μm obtained by the hydrolysis of aluminum isopropyl alcoholate, was added to the above alumina slurry in the proportion (calculated as boehmite) as identified in Table 1, and the mixture was uniformly mixed by a high performance mixer to obtain a polishing agent sample.

Polishing test

As the object to be polished, a substrate of a 3.5 inch memory hard disk (outer diameter: about 95 mm) which is plated with a nickel-phosphorus alloy by electroless plating (a plating layer of alloy comprising from 90 to 92% of nickel and from 8 to 10% of phosphorus) to an aluminum substrate, was used. The disk was mounted on a double-side polishing machine having a suede type polyurethane base polishing pad mounted on each of upper and lower tables of the polishing machine, and polishing was conducted for five minutes by mutually sliding the disk and the two polishing pads.

The polishing was conducted under a polishing pressure of 100 g/cm² by supplying the above-mentioned polishing agent sample at a rate of 300 cc per minute between the disk and the two polishing pads. After the polishing, the disk was taken out from the double-side polishing machine, and supersonic cleaning was repeated to clean the polished surface of the disk, whereupon the presence or absence and the degree of the surface defects were evaluated by visual inspection with various instruments. Then, the thickness of the disk was measured, and from the reduction in the thickness, the average polishing rate per minute was calculated. The test results are shown in Table 1.

TABLE 1

| Polishing agent sample Nos. | Amount of boehmite (wt %)* | Average polishing rate (μm/min) | Surface defects |
| --- | --- | --- | --- |
| 1 | 0 | 0.26 | Scratch marks and orange peel observed |
| 2 | 0.4 | 0.30 | No defect observed |
| 3 | 0.8 | 0.44 | " |
| 4 | 1.5 | 0.56 | " |
| 5 | 5 | 0.58 | " |
| 6 | 10 | 0.54 | " |

*% by weight, based on the total amount of the composition

EXAMPLE 2

Aluminum hydroxide was calcined at 1,300° C. for 5 hours and pulverized in a dry system to obtain α-alumina having an average particle size of 0.54 μm and the maximum particle size of 8 μm, which was dispersed in water to obtain a slurry having a concentration of 6% by weight. The same boehmite sol as used in Example 1 was added in the proportion as identified in Table 2 to obtain a polishing agent sample in the same manner as in Example 1. A polishing test was conducted in the same manner as in Example 1 by using this polishing agent sample. The test results are shown in Table 2.

TABLE 2

| Polishing agent sample Nos. | Amount of boehmite (wt %)* | Average polishing rate (μm/min) | Surface defects |
| --- | --- | --- | --- |
| 7 | 0 | 0.36 | Many scratch marks |
| 8 | 0.5 | 0.48 | Little scratch marks |
| 9 | 1.5 | 0.65 | " |
| 10 | 5.0 | 0.85 | " |
| 11 | 10.0 | 0.86 | " |

*% by weight, based on the total amount of the composition

EXAMPLE 3

Polishing tests were conducted by using Sample Nos. 1 to 5 as used in Example 1, as the polishing agent samples, and a polymethylmethacrylate substrate having a diameter of 50 mm as the object to be polished. On each of the upper and lower tables of the double-side polishing machine, a pad made of the same but softer material as used in Example 1 was mounted. The polishing was conducted for 10 minutes by mutually sliding the substrate and the two polishing pads under a polishing pressure of 190 g/cm² while supplying the polishing agent sample at a rate of 600 cc per minute. After completion of the polishing, the substrate was taken out, and the polished surface was cleaned by supersonic cleaning, and the presence or absence and the degree of the surface defects were evaluated by visual inspection with various instruments.

Then, the weight of the substrate was measured, and the weight loss by the polishing was calculated and the polishing amount per minute was obtained. The test results are shown in Table 3.

TABLE 3

| Polishing agent sample Nos. | Amount of boehmite (wt %)* | Polishing amount (mg/min) | Surface defects |
|---|---|---|---|
| 1 | 0 | 6.1 | Orange peel observed |
| 2 | 0.4 | 9.5 | No defect observed |
| 3 | 0.8 | 12.0 | " |
| 4 | 1.5 | 14.3 | " |
| 5 | 5.0 | 14.9 | " |

*% by weight, based on the total amount of the composition

EXAMPLE 4

By using the same u-alumina as used in Example 2, a slurry having concentration of 6% by weight was prepared. To this slurry, boehmite and a water-soluble metal salt were added and dispersed in the proportions as identified in Table 4 to obtain a polishing composition. As the boehmite, Pural SCF (tradename) (average particle size: about 20 μm) manufactured by Condea Chemic was used. The polishing was conducted for five minutes in the same manner as in Example 1 by using a substrate of a 3.5 inch memory hard disk prepared by applying a nickel-phosphorus plating to an aluminum substrate as used in Example 1. After the polishing, the presence or absence of defects on the polished surface was evaluated, and the average polishing rate was calculated, in the same manner as in Example 1. The results are shown in Table 4.

alumina having an average particle size of 0.49 μm and the maximum particle size of 5 μm, which was dispersed in water by a high performace mixer to obtain a slurry having an α-alumina concentration of 8% by weight. To this slurry, boehmite and a water-soluble salt were added and dispersed in the proportions as identified in Table 5 to obtain a polishing agent sample. As the boehmite, a boehmite sol obtained by subjecting aluminum hydroxide to hydrothermal treatment in an autoclave at 250° C., was used.

POLISHING TEST

As the object to be polished, a polycarbonate disk having a diameter of 50 mm was used, and this disk was mounted on a double-side polishing machine and polished.

On each of the upper and lower tables of the polishing machine a suede type soft polyurethane base polishing pad was mounted. The polishing was conducted for 5 minutes by mutually sliding the disk and the polishing pads under a polishing pressure of 80 g/cm$^2$ while supplying the polishing agent sample at a rate of 500 cc per minute between the disk and the polishing pads. After completion of the polishing, the disk was taken out from the polishing machine, and the polished surface was cleaned by supersonic cleaning, whereupon the presence and absence and the degree of surface defects were evaluated by visual observation.

Then, the weight of the disk was measured, and the weight loss by the polishing was calculated and the average polishing amount per minute was obtained The test results are shown in Table 5.

TABLE 4

| Polishing agent sample Nos. | Amount of boehmite (wt %)* | Water-soluble metal salt Type | Amount (wt %)* | Average polishing rate (μm/min) | Surface defects (scratch marks) |
|---|---|---|---|---|---|
| 1 | 1.5 | MgSO$_4$.7H$_2$O | 1 | 0.72 | Nil |
| 2 | " | " | 5 | 0.85 | " |
| 3 | " | " | 10 | 0.83 | " |
| 4 | " | MgCl$_2$.6H$_2$O | 1 | 0.80 | " |
| 5 | " | " | 5 | 1.12 | " |
| 6 | " | " | 10 | 1.14 | " |
| 7 | " | Ca(NO$_3$)$_2$.4H$_2$O | 1 | 0.81 | " |
| 8 | " | " | 5 | 1.20 | " |
| 9 | " | " | 10 | 1.17 | " |
| 10 | " | AlK(SO$_4$)$_2$.12H$_2$O | 1 | 0.69 | " |
| 11 | " | " | 5 | 0.84 | " |
| 12 | " | " | 10 | 0.80 | " |
| 13 | 3.0 | MgSO$_4$.7H$_2$O | 1 | 0.77 | " |
| 14 | " | " | 5 | 0.93 | " |
| 15 | " | " | 10 | 0.92 | " |
| 16 | " | MgCl$_2$.6H$_2$O | 1 | 0.85 | " |
| 17 | " | " | 5 | 1.24 | " |
| 18 | " | " | 10 | 1.27 | " |
| 19 | " | Ca(NO$_3$)$_2$.4H$_2$O | 1 | 0.89 | " |
| 20 | " | " | 5 | 1.34 | " |
| 21 | " | " | 10 | 1.31 | " |
| 22 | " | AlK(SO$_4$)$_2$.12H$_2$O | 1 | 0.75 | " |
| 23 | " | " | 5 | 0.90 | " |
| 24 | " | " | 10 | 0.93 | " |
| Comparative Example 1 | Nil | Nil | 0 | 0.36 | Many |

*% by weight, based on the total amount of the composition

EXAMPLE 5

Aluminum hydroxide was calcined at 1,200° C. for 5 hours and pulverized in a dry system to obtain α-

TABLE 5

| Polishing agent sample Nos. | Amount of boehmite (wt %)* | Water-soluble metal salt Type | Amount (wt %)* | Average polishing amount (mg/min) | Surface defects (scratch marks) |
|---|---|---|---|---|---|
| 25 | 1.5 | $MgCl_2 \cdot 6H_2O$ | 1 | 21.9 | Nil |
| 26 | " | " | 5 | 23.7 | " |
| 27 | " | $AlK(SO_4)_2 \cdot 12H_2O$ | 1 | 24.1 | " |
| 28 | " | " | 5 | 25.2 | " |
| Comparative Example 2 | Nil | Nil | 0 | 8.2 | Many |

*% by weight, based on the total amount of the composition

EXAMPLE 6

By using the same α-alumina as used in Example 2, a slurry having a concentration of 6% by weight was prepared. To this slurry, boehmite and an ammonium salt of an inorganic or organic acid were added and dispersed in the proportions as identified in Table 6 to obtain a polishing agent sample. The boehmite was the same as used in Example 4.

The polishing test was conducted in the same manner as in Example 1 by using a 3.5 inch memory hard disk prepared by applying a nickel-phosphorus plating to an aluminum substrate as used in Example 1. With respect to the disk after the polishing, the degree of surface defects was evaluated and the average polishing rate was calculated, in the same manner as in Example 1. The results are shown in Table 6.

TABLE 6

| Polishing agent sample Nos. | Amount of boehmite (wt %)* | Ammonium salt Type | Amount (wt %)* | Average polishing rate (μm/min) | Surface defects (scratch marks) |
|---|---|---|---|---|---|
| 1 | 1.5 | $NH_4NO_3$ | 1 | 0.65 | Nil |
| 2 | " | " | 5 | 0.72 | " |
| 3 | " | " | 10 | 0.70 | " |
| 4 | " | $(NH_4)_2HPO_4$ | 1 | 0.65 | " |
| 5 | " | " | 5 | 0.74 | " |
| 6 | " | " | 10 | 0.73 | " |
| 7 | " | $NH_4Cl$ | 1 | 0.71 | " |
| 8 | " | " | 5 | 0.84 | " |
| 9 | " | " | 10 | 0.80 | " |
| 10 | " | $(NH_4)_2SO_4$ | 1 | 0.86 | " |
| 11 | " | " | 5 | 1.03 | " |
| 12 | " | " | 10 | 0.93 | " |
| 13 | " | $CH_3COONH_4$ | 1 | 0.87 | " |
| 14 | " | " | 5 | 1.05 | " |
| 15 | " | " | 10 | 1.00 | " |
| 16 | 3 | $NH_4NO_3$ | 1 | 0.67 | " |
| 17 | " | " | 5 | 0.80 | " |
| 18 | " | " | 10 | 0.80 | " |
| 19 | " | $(NH_4)_2HPO_4$ | 1 | 0.70 | " |
| 20 | " | " | 5 | 0.85 | " |
| 21 | " | " | 10 | 0.81 | " |
| 22 | " | $NH_4Cl$ | 1 | 0.79 | " |
| 23 | " | " | 5 | 0.93 | " |
| 24 | " | " | 10 | 0.90 | " |
| 25 | " | $(NH_4)_2SO_4$ | 1 | 0.84 | " |
| 26 | " | " | 5 | 1.14 | " |
| 27 | " | " | 10 | 1.07 | " |
| 28 | " | $CH_3COONH_4$ | 1 | 0.93 | " |
| 29 | " | " | 5 | 1.18 | " |
| 30 | " | " | 10 | 1.10 | " |
| Comparative Example 1 | 0 | Nil | 0 | 0.36 | Many |

*% by weight, based on the total amount of the composition

EXAMPLE 7

By using α-alumina as used in Example 2, a slurry having a concentration of 6% by weight, was prepared. To this slurry, the metal nitrite and boehmite were added and dispersed in the proportions as identified in Table 7 to obtain a polishing agent sample. As the boehmite, Pural SCF (tradename) (average particle size: 20 μm) manufactured by Condea Chemie, was used.

The polishing test was conducted in the same manner as in Example 1, and the results are shown in Table 7.

TABLE 7

| Polishing agent sample Nos. | Metal nitrite Type | Metal nitrite Amount (wt %)* | Amount of boehmite (wt %)* | Average polishing rate (μm/min) | Surface defects (scratch marks) |
| --- | --- | --- | --- | --- | --- |
| 1 | Ca(NO₂)₂.H₂O | 0.1 | 1.5 | 0.85 | Nil |
| 2 | " | 0.5 | " | 0.90 | " |
| 3 | " | 1 | " | 0.96 | " |
| 4 | " | 5 | " | 0.95 | " |
| 5 | " | 10 | " | 0.90 | " |
| 6 | NaNO₂ | 0.1 | " | 0.81 | " |
| 7 | " | 0.5 | " | 0.85 | " |
| 8 | " | 1 | " | 0.92 | " |
| 9 | " | 5 | " | 0.94 | " |
| 10 | " | 10 | " | 0.90 | " |
| 11 | KNO₂ | 0.1 | " | 0.82 | " |
| 12 | " | 0.5 | " | 0.85 | " |
| 13 | " | 1 | " | 0.89 | " |
| 14 | " | 5 | " | 0.93 | " |
| 15 | " | 10 | " | 0.91 | " |
| 16 | Ca(NO₂)₂.H₂O | 0.1 | 3 | 0.95 | " |
| 17 | " | 0.5 | " | 1.10 | " |
| 18 | " | 1 | " | 1.19 | " |
| 19 | " | 5 | " | 1.20 | " |
| 20 | " | 10 | " | 1.13 | " |
| 21 | NaNO₂ | 0.1 | " | 0.89 | " |
| 22 | " | 0.5 | " | 1.00 | " |
| 23 | " | 1 | " | 1.06 | " |
| 24 | " | 5 | " | 1.11 | " |
| 25 | " | 10 | " | 1.03 | " |
| 26 | KNO₂ | 0.1 | " | 0.85 | " |
| 27 | " | 0.5 | " | 0.91 | " |
| 28 | " | 1 | " | 0.97 | " |
| 29 | " | 5 | " | 1.07 | " |
| 30 | " | 10 | " | 1.00 | " |

*% by weight, based on the total amount of the composition

What is claimed is:

1. A polishing composition comprising water, α-alumina and boehmite wherein the α-alumina is in an amount of from 1 to 30% by weight and the boehmite is in an amount of from 0.1 to 20% by weight, based on the total amount of the composition.

2. The composition according to claim 1, wherein the boehmite is in an amount of from 0.5 to 10% by weight based on the total amount of the composition.

3. The composition according to claim 1, wherein the α-alumina has an average particle size of from 0.1 to 10 μm.

4. The composition according to claim 1, wherein the α-alumina is the one obtained by calcining an alumina other than α-alumina at a temperature of at least 1,200° C.

5. The composition according to claim 1, which further contains at least one member selected from the group consisting of a surfactant, cellulose and a cellulose derivative.

6. A polishing composition comprising water, α-alumina, boehmite and a water-soluble metal salt wherein the α-alumina is in an amount of from 1 to 30% by weight, the boehmite is in an amount of from 0.1 to 20% by weight and the water-soluble metal salt is in an amount of from 0.1 to 20% by weight, based on the total amount of the composition.

7. The composition according to claim 6, wherein the water-soluble metal salt has a solubility of at least 1 g per 100 g of water.

8. The composition according to claim 6, wherein the water-soluble metal salt is an inorganic acid salt of an alkaline earth metal.

9. The composition according to claim 6, wherein the water-soluble metal salt is at least one member selected from the group consisting of magnesium nitrate, magnesium chloride, magnesium sulfate, calcium nitrate, aluminum nitrate and aluminum sulfate.

10. The composition according to claim 7, wherein the boehmite is in an amount of from 0.5 to 10% by weight based on the total amount of the composition.

11. The composition according to claim 7, which further contains at least one member selected from the group consisting of a surfactant, cellulose and a cellulose derivative.

12. A polishing composition comprising water, α-alumina, boehmite and an ammonium salt of an inorganic or organic acid wherein the α-alumina is in an amount of from 1 to 30% by weight, the boehmite is in an amount of from 0.1 to 20% by weight and the ammonium salt of an inorganic or organic acid is in an amount of from 0.1 to 20% by weight, based on the total amount of the composition.

13. The composition according to claim 12, wherein the ammonium salt of an inorganic or organic acid is selected from the group consisting of ammonium nitrate, ammonium monohydrogenphosphate, ammonium chloride, ammonium sulfate and ammonium acetate.

14. The composition according to claim 12, wherein the ammonium salt is an ammounium salt of an inorganic acid.

15. The composition according to claim 14, wherein the ammonium salt of an inorganic acid is ammonium sulfate.

16. The composition according to claim 12, wherein the ammonium salt is an ammonium salt of an organic acid.

17. The composition according to claim 16, wherein the ammonium salt of an organic acid is ammonium acetate.

18. The composition according to claim 12, which further contains at least one member selected from the group consisting of a surfactant, cellulose and a cellulose derivative.

19. The composition according to claim 12, which is useful for polishing a surface of a memory hard disk plated with nickel or a nickel alloy.

20. A polishing composition comprising water, α-alumina, boehmite and a metal nitrite wherein the α-alumina is in an amount of from 1 to 30% by weight, the boehmite is in an amount of from 0.1 to 20% by weight, and the metal nitrite is in an amount of from 0.1 to 20% by weight, based on the total amount of the composition.

21. The composition according to claim 20, wherein the metal nitrite is a nitrite of a metal in Group I, II or III of the Periodic Table.

22. The composition according to claim 20, wherein the nitrite is selected from the group consisting of sodium nitrite, potassium nitrite and calcium nitrite.

23. The composition according to claim 20, which further contains at least one member selected from the group consisting of a surfactant, cellulose and a cellulose derivative.

24. The composition according to claim 20, which is useful for polishing a surface of a memory hard disk plated with nickel or nickel alloy.

* * * * *